(12) United States Patent
Kelly et al.

(10) Patent No.: US 10,208,474 B2
(45) Date of Patent: Feb. 19, 2019

(54) ELEVATABLE BUILDING FOR PREVENTING FLOOD DAMAGE

(71) Applicant: LARKFLEET LIMITED, Bourne, Lincolnshire (GB)

(72) Inventors: Tom Kelly, Bourne (GB); Graham Hicks, Bourne (GB)

(73) Assignee: Larkfleet Limited (GB)

( * ) Notice: Subject to any disclaimer, the term of this patent is extended or adjusted under 35 U.S.C. 154(b) by 0 days.

(21) Appl. No.: 15/566,647

(22) PCT Filed: Apr. 12, 2016

(86) PCT No.: PCT/GB2016/051017
§ 371 (c)(1),
(2) Date: Oct. 13, 2017

(87) PCT Pub. No.: WO2016/166519
PCT Pub. Date: Oct. 20, 2016

(65) Prior Publication Data
US 2018/0142461 A1 May 24, 2018

(30) Foreign Application Priority Data
Apr. 13, 2015 (GB) .................................. 1506172.4

(51) Int. Cl.
*E04H 9/14* (2006.01)
*E04B 1/343* (2006.01)
(Continued)

(52) U.S. Cl.
CPC .......... *E04B 1/34363* (2013.01); *E03B 1/041* (2013.01); *E03B 7/04* (2013.01);
(Continued)

(58) Field of Classification Search
CPC . E02D 27/36; E02D 27/06; B63B 2035/4426; B63B 21/50; B63B 35/732;
(Continued)

(56) References Cited

U.S. PATENT DOCUMENTS 2,189,486 A * 2/1940 D Amico ............ E04B 1/34363
109/47
2,715,756 A * 8/1955 Carver .................... E04H 9/145
405/229
(Continued)

FOREIGN PATENT DOCUMENTS

DE 10234049 A1 2/2004
DE 102013011901 A1 1/2015
(Continued)

*Primary Examiner* — Gisele D Ford
(74) *Attorney, Agent, or Firm* — Endurance Law Group PLC

(57) ABSTRACT

An elevatable building including a foundation (18) set into a ground surface and a platform (15) that, in the event of a flood, is to be elevated by a lifting mechanism (19). The building includes lightweight walls (14) and a roof assembled on the platform (15) to form a house. An adaptable connection (28) for utility services is provided which adjusts to the height from ground level of the platform when it is raised or lowered by the lifting mechanism so that vital service to the house can remain uninterrupted.

29 Claims, 6 Drawing Sheets

(51) Int. Cl.
*E03B 1/04* (2006.01)
*E03B 7/04* (2006.01)
*E03B 11/02* (2006.01)
*E04B 1/34* (2006.01)
*B66F 3/08* (2006.01)

(52) U.S. Cl.
CPC ............ *E03B 11/02* (2013.01); *E04B 1/3408* (2013.01); *E04H 9/145* (2013.01); *B66F 3/08* (2013.01); *E03B 2001/045* (2013.01); *Y02A 30/23* (2018.01); *Y02A 50/14* (2018.01)

(58) Field of Classification Search
CPC ......... B63B 35/44; Y02A 30/21; E02B 3/064; E04H 9/145
See application file for complete search history.

(56) References Cited

U.S. PATENT DOCUMENTS

| | | | | |
|---|---|---|---|---|
| 5,347,949 A * | 9/1994 | Winston | ............... | B63B 35/44 114/264 |
| 5,647,693 A * | 7/1997 | Carlinsky | ............... | B63B 35/44 405/229 |
| 5,775,353 A * | 7/1998 | Johnson | ............... | B63B 17/02 135/96 |
| 5,904,446 A * | 5/1999 | Carlinsky | ............... | B63B 35/44 405/229 |
| 6,050,207 A | 4/2000 | Mays | | |
| 6,347,487 B1 * | 2/2002 | Davis | ............... | E04H 9/145 52/1 |
| 6,996,937 B2 * | 2/2006 | Halloran | ............... | F03B 13/06 290/1 R |
| 7,216,603 B2 * | 5/2007 | Towley, III | ............... | B63B 35/44 114/263 |
| 7,607,864 B2 * | 10/2009 | Kenady | ............... | B63B 21/50 405/229 |
| 7,921,604 B2 * | 4/2011 | Lino | ............... | E04H 9/14 114/264 |
| 8,926,223 B1 * | 1/2015 | DeStefano | ............... | B63B 35/44 114/264 |
| 9,238,920 B1 * | 1/2016 | Carlinsky | ............... | E04H 9/145 |
| 9,249,594 B2 * | 2/2016 | DeStefano | ............... | E02D 27/32 |
| 9,551,452 B1 * | 1/2017 | Thorne | ............... | F16M 5/00 |
| 2004/0261338 A1 * | 12/2004 | De Cherance | ............ | E02D 27/36 52/292 |
| 2005/0092218 A1 | 5/2005 | Saucier et al. | | |
| 2013/0199113 A1 * | 8/2013 | Nelson | ............... | B63B 35/44 52/169.1 |
| 2015/0121778 A1 * | 5/2015 | Rawding | ............... | E04H 9/145 52/169.9 |
| 2016/0281382 A1 * | 9/2016 | Groves | ............... | E04H 9/145 |

FOREIGN PATENT DOCUMENTS

| | | |
|---|---|---|
| GB | 2356648 A | 5/2001 |
| WO | 1996030602 A1 | 10/1996 |
| WO | 2006100698 A1 | 9/2006 |

* cited by examiner

ELEVATABLE BUILDING FOR PREVENTING FLOOD DAMAGE

The present invention relates to an elevatable building for flood damage prevention, particularly a residential house of lightweight construction that can be raised above a rising water level, in flood risk areas.

BACKGROUND TO THE INVENTION

It is a common problem that land in particular regions, e.g. close to a waterway or beach, can be prone to flooding on a regular, intermittent or unpredictable basis. Furthermore, climate change and extreme weather events potentially increases the probability of flooding in a given area and/or introduces risk to places where there had never previously been a problem. This issue has particular significance in the UK and will be an ever increasing problem as population density increases.

Real estate in flood prone areas is often desirable for aesthetic reasons but can be uninsurable due to the high probability of damage to conventional building structures. Conversely, land in flood prone areas can be obtained at lower cost, such that it is attractive for social housing, but presents a high risk as a building project.

It is clear that the ever increasing likelihood of flood events has created a need for housing which can resist and/or otherwise survive periods of flood.

The most common strategy for reacting to a flood situation is to build barriers, e.g. of sandbags, that deflect water around a home or larger collection of buildings. Such solutions must be deployed rapidly which presents significant challenges and, in any event, the degree of protection is limited by height of such barriers which, in turn, is limited by resources and other practical considerations.

In countries that have large regions under constant threat of inundation, such as The Netherlands, other approaches to the problem of flooding have been explored. A popular approach is to utilise floating structures/foundations upon which to build a house. Indeed, such technology is often used to produce permanently floating houses which can be located on a river or canal, etc.

Known types of floating house system include a hull type and a raft type. The hull type excludes water in the same way a boat does and, at a certain depth of water, becomes buoyant. The raft type incorporates buoyancy into a deep supporting foundation slab. The completed building is typically moored to a post, e.g. by steel arms, and can rise and fall with flood waters or tide. These types of design are appropriate for water fronts or controlled flooding locations; however, they are not suited for situations where there are high flow flood waters and where flood debris is likely. It is also noteworthy that the UK Housing Act gives security of tenure to people living legally on land, but floating dwellings such as house boats do not have the same security of tenure. Furthermore, with regard to hull and raft types of floating house, there is a lack of control when returning the property to ground level after flood waters recede.

Another form of floating home is an amphibious house type which is secured on thick steel posts. Such designs can be more resilient to flood because of the more secure structure. An amphibious house uses a passive lifting system based on buoyancy where it may have a hollow concrete basement and telescopic piles allowing the house to rise with water level. One problem associated with such designs is that there is no way to control the lowering of the house when waters recede which could lead to debris being trapped underneath the base, resulting in an uneven resting position. Similarly, these solutions are not suited to occasionally flooded land because of the high build price (roughly twice a traditional house).

WO98/22663 describes a floatation system for a building that includes a watertight basement that can rise and fall in relation to guideposts located at the corners. The guideposts have a ratchet system to maintain the building at a desired height, by virtue of rising water. The preferred embodiment also envisages the use of pressurised cylinders for lifting the building prior to a surge of flood water. Nevertheless, such an elaborate system is very expensive to build and unsuited for social housing projects intended to be erected on low cost land.

WO2006/100698, DE10234049, WO96/30602 and US2005/092218 describe buildings that are generally retractable into the ground for the purposes of storm, i.e. high wind, damage prevention. These constructions are not suitable for flood risk mitigation and, in fact, increase the likelihood of damage.

SUMMARY OF THE INVENTION

The present invention seeks to provide an elevatable building/house for use in flood risk areas. The building structure is intended to be relatively low cost and lightweight, but capable of being erected on land that is considered to have less real estate value due to its risk of flood, where traditional building structures are uninsurable.

In a broad aspect of the invention there is provided an elevatable building for flood damage prevention according to claim 1. Further features of the invention are defined in the appended claims.

An elevatable building according to the invention is comprised of a platform upon which is built a building structure of lightweight walls, wherein the platform is associated with a lifting mechanism having a plurality of vertical members engaged with a driving means for raising and lowering the platform. According to the invention, provision for water/waste drainage and utilities are made by an adaptable connection that preferably remains connected (i.e. water and electrical) during periods when the house is elevated, assuming service is otherwise uninterrupted by the supplier.

For the purposes of interpretation, the "platform" could be an integral base frame built with the house.

In the context of the invention a "lightweight wall" is defined as a wall suitable for use as a sidewall on a house, i.e. including external cladding, insulation and internal covering, which has a relatively low density and/or weight per unit area compared to traditional building materials such as stone, concrete or brick. A lightweight wall can still include the provision for a glass component. The wall may be made of a variety of materials which meet the general weight/area criteria; e.g. kiln dried timber, light gauge galvanised steel or other possibilities such as composites of basalt and glass fibre. In general, a lightweight construction material within the meaning of the invention is a material that improves a building's SAP (Standard Assessment Procedure) rating by substituting one material for another while having lighter physical weight properties.

A frame may be incorporated into a lightweight wall but would generally exclude the use of green roof materials, such as sedum which are heavy. Use in conjunction with high levels of air tightness and controlled ventilation, a lightweight construction can be highly energy efficient for building design.

With regard to the roof of the house, this would preferably be made from flat boarding, tile or plastic/zinc sheeting.

In one form of the invention the drive means is activated automatically in response to a flood warning signal, e.g. using a centralised control system/unit. The warning may be developed in conjunction with the system of the invention or adapted from existing systems such as the "Jigsaw Flood Guard: real time, web-based flood warning system" (Wigan, UK). One embodiment may feature activation by a flow switch. In either case, the provision must be made for raising the building when occupants are not in residence.

The lifting mechanism is preferably a "power jack" type with vertical members being elongate threaded/screw rods that are rotated in order to extend relative to an annular mounting. In a basic form of the invention it is expected that there would be one screw rod per corner of the building, however, the mechanism is scalable so that additional screw rods could be installed in order to distribute the lifting mechanism's load bearing capacity to support heavier and higher buildings. In a preferred form, each vertical screw rod is associated with a foot element, set into a foundation, that receives a distal end of the rod and supports rotating movement thereof.

No flood proof building design currently exists that can address the problem of developing housing in flood risk villages, towns and cities across a country that is subject to occasional flood risk. The designs that do exist are prohibitively expensive and more suited to continually flooded land. The present invention is intended to embody an economically viable house that does not flood and can be constructed by building techniques and architectural styles (appearance) that are relatively traditional in nature. An ultra-lightweight waterproof structure is a prerequisite for building a house that is able to be actively raised/lowered on a platform/frame, while also including flexible utilities systems that will maintain services during a flood event.

DETAILED DESCRIPTION OF A PREFERRED EMBODIMENT

Figure 1:
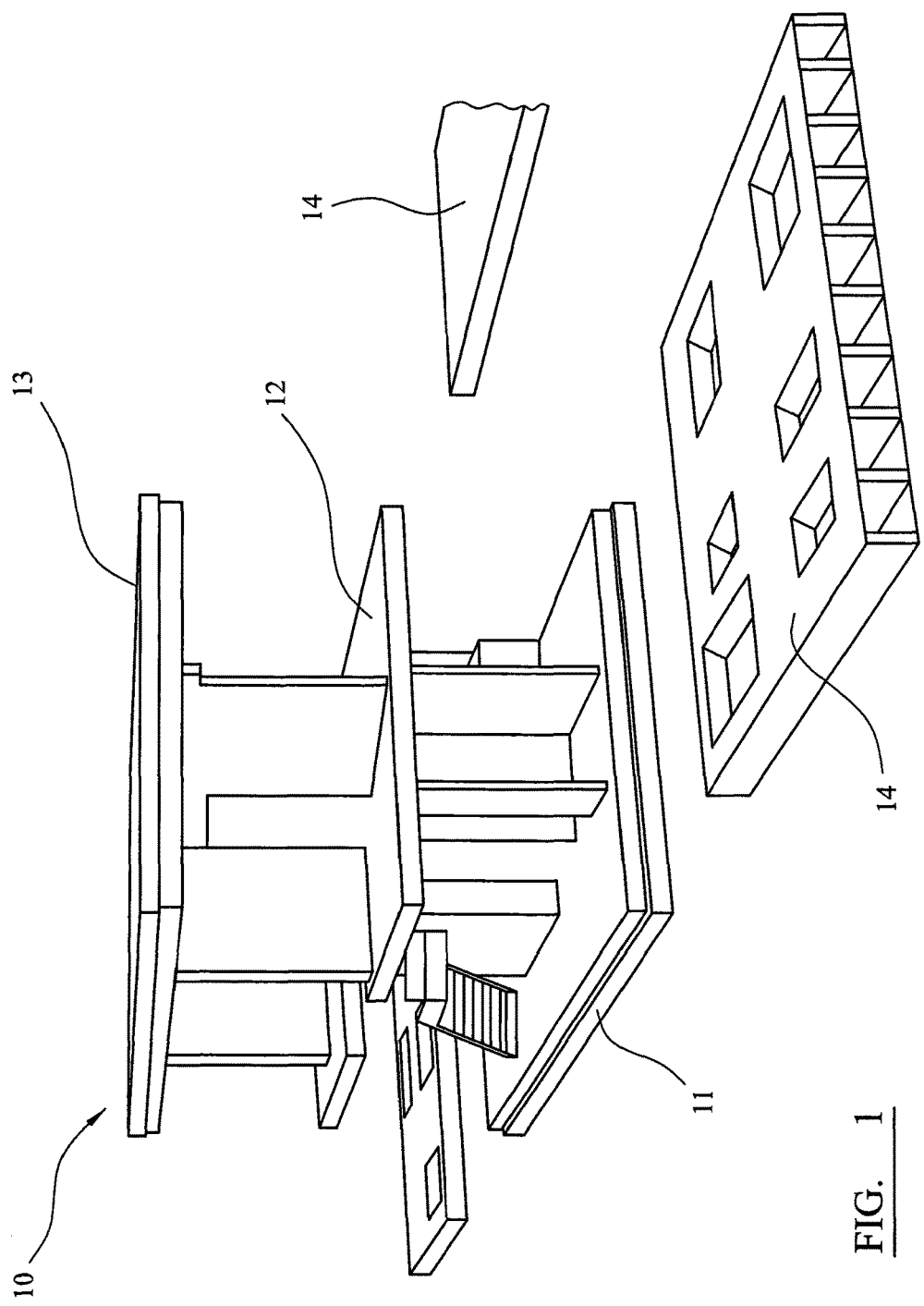
FIG. 1 illustrates a general view of a lightweight house construction, incorporated into an elevatable building according to the invention.

FIG. 1 illustrates the type of building structure that is intended to be erected for use with an elevatable platform and lightweight house/building according to the present invention. Particularly, a house considered suitable for use would incorporate composite technology (as pictured in FIG. 1). However, other forms of lightweight building are possible, e.g. utilising timber or a light gauge steel frame as a solution.

In the illustrated form, house 10 is built on two levels with a main base 11, a first floor 12 and a roof 13. Roof 13 is shown with a flat configuration, but it could take any conventional form, including multiple pitch designs. House 10 is intended to be constructed from state-of-the-art techniques and materials to meet current building standards. The dwelling (e.g. particularly the base 11, roof 13 and side walls 14—shown in collapsed form in FIG. 1) should be weatherproof, but not necessarily sealed because it is intended to lift above flood waters should the need arise, as will be described hereinafter. Furthermore, the base and floor surfaces must bear the respective loads of building weight and items kept in the house such as furniture etc.

It is a particular feature of a house according to the invention that the floors and walls 14 are constructed from lightweight materials that provide significant insulation properties. House 10 is intended to be energy efficient so that the cost of heating and/or cooling the living space will be minimised.

A skilled person in the art of modern building manufacture will be familiar with the kinds of materials and specifications used to construct a lightweight house according to the invention. An exact selection of materials is not intended to limit the invention. Of course, it will be possible to substitute various components for alternative, new and/or improved materials as these become known.

FIGS. 2 to 8 illustrate a preferred form of elevating platform/mechanism upon which a house as shown in FIG. 1 could be mounted. The platform is constructed from rigid beam members 15 in a shape that generally conforms to the base 11 of house 10. In the illustrated form this is a rectangle, however, other shapes are contemplated such as an L-shape. Indeed, the elevatable platform 15 could also incorporate curved/circular parts depending on the house design. Furthermore, platform 15 as illustrated could be incorporated with base 11 such that a separate platform and base is unnecessary. This is particularly the case where a steel frame house system is utilised, making up the majority of the base, wall and roof components.

Platform 15 is associated with a series of guide posts 16 passing therethrough, preferably located at strategic positions, e.g. at a corner of the platform. Each guide post is received by a sleeve 17 (best seen in FIG. 8) provided through platform beam 15 and co-extends with its associated post far enough to ensure that platform 15 must rise or fall evenly and in a substantially horizontal plane. Guide posts 16 could be fully telescopic in nature. Preferably, posts 16 move within the cavity space in the walls and can be fully integrated into the design so they are not externally visible. In such cases, internal removable panels will be needed for maintenance. Services may also utilise the void in the cavity i.e. potable water.

Figure 2:
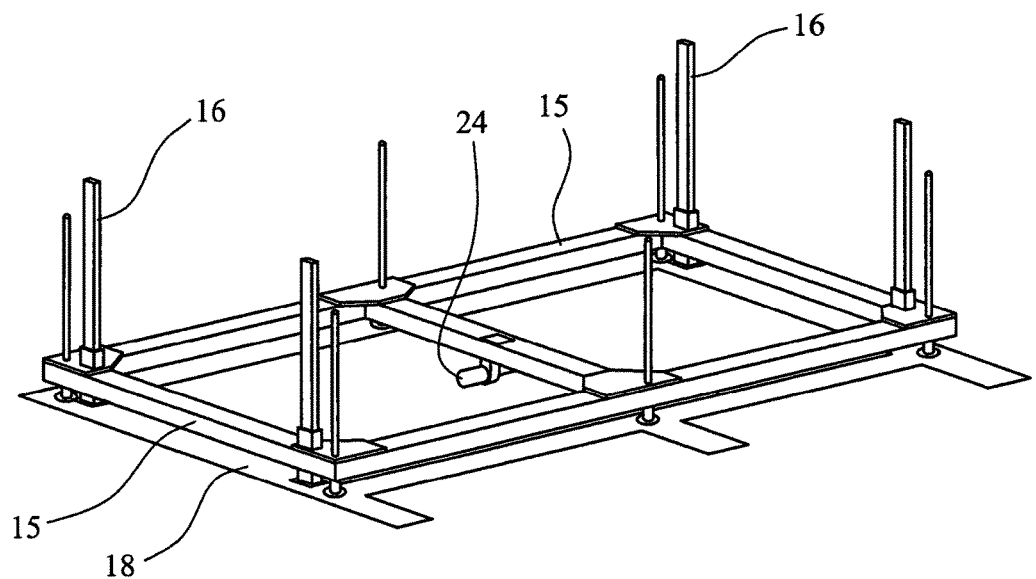
FIG. 2 illustrates an elevatable platform in the lowered position.
Figure 3:
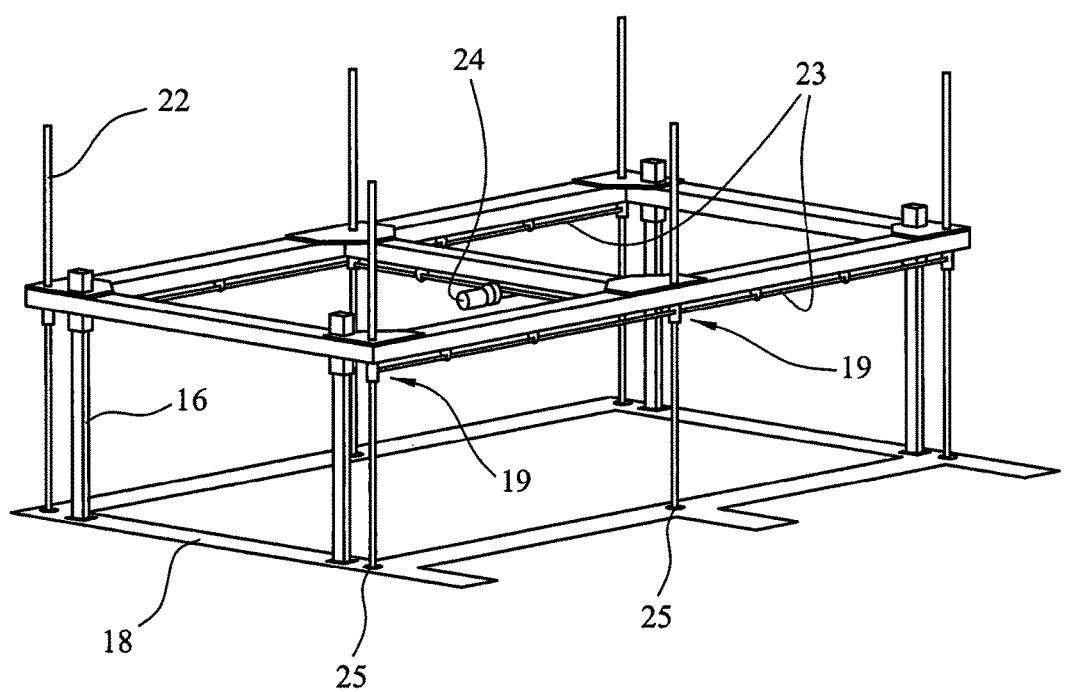
FIG. 3 illustrates the elevatable platform from FIG. 2 in a raised position.

It is noteworthy that a foundation portion 18 (preferably of concrete) should preferably be arranged in a horizontally level excavation, however, it is conceivable that the foundation could be built into uneven ground and guideposts 16 have corresponding uneven lengths, but ensure that the platform/base 15 itself remains horizontally level at all times. At its lowest level (as shown in FIG. 2) platform 15 could rest on piles or other foundation supports that achieve a horizontal resting place for platform 15. The building should ideally remain at least partially raised above the ground at all times.

Also at strategic points around platform 15 a series of powered lifting devices, generally denoted 19, are located. In the illustrated form these devices 19 are often adjacent a guidepost 16, but this is not essential. Furthermore, lifting devices 19 are shown only at a peripheral edge of platform 15 but could be located in any convenient position inside the periphery. Indeed, a guidepost and lifting device could be located at a central portion of the house corresponding to the centre of gravity and, in practice, hidden within a wall or column, with internal panels of the house allowing access for maintenance of the system.

Figure 4:
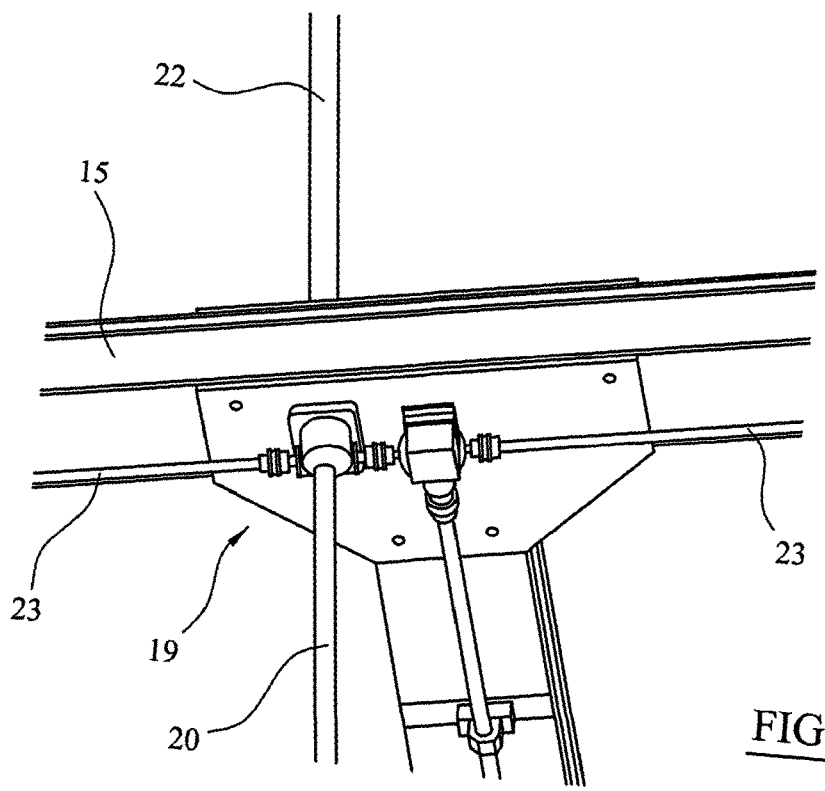
FIG. 4 illustrates an underside view of an elevating mechanism according to the invention.
Figure 5:
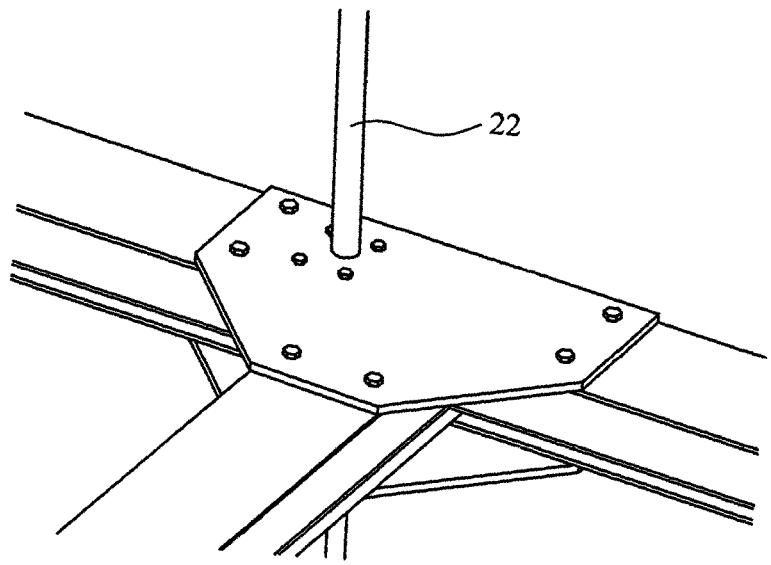
FIG. 5 illustrates an overview, corresponding to FIG. 4.
Figure 6:
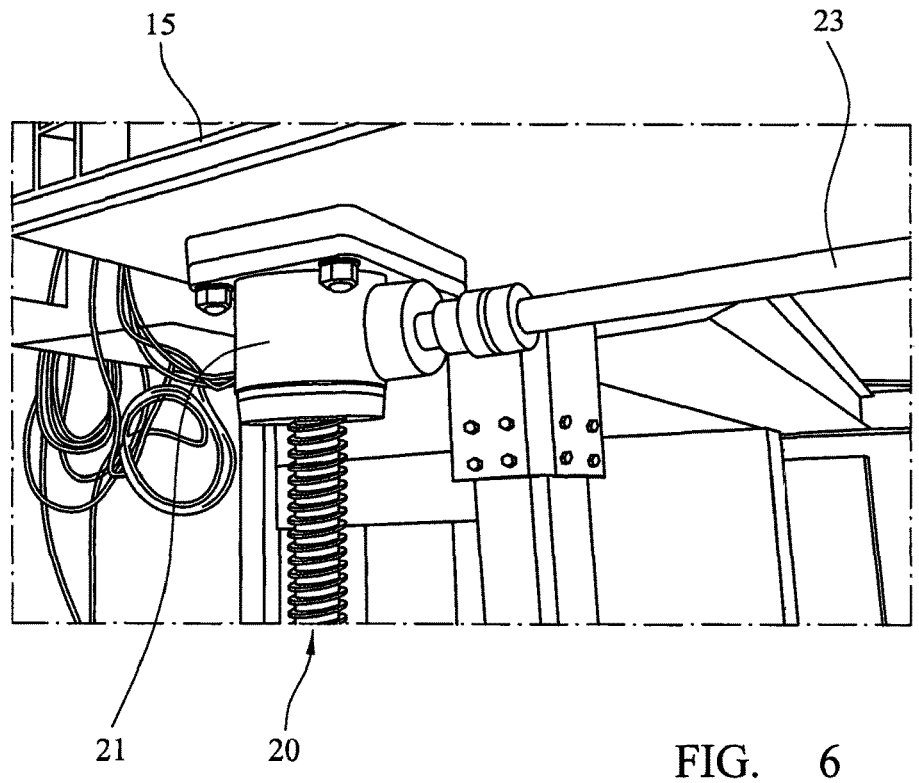
FIG. 6 shows a pictorial view of an elevating mechanism.
Figure 7:
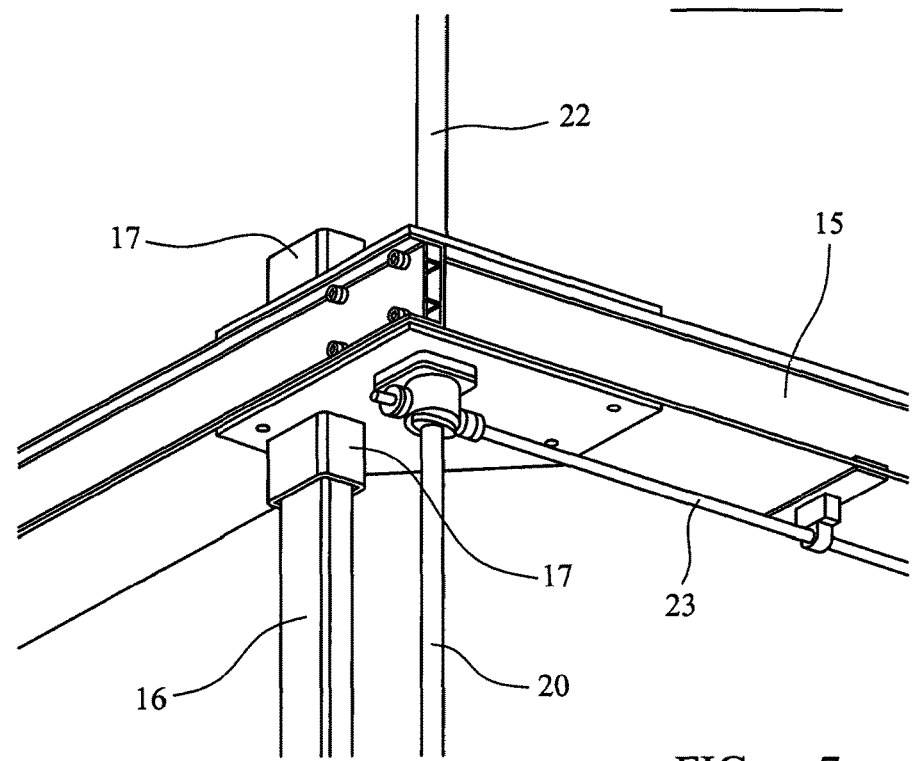
FIG. 7 illustrates an underside view of a corner of the elevatable platform.
Figure 8:
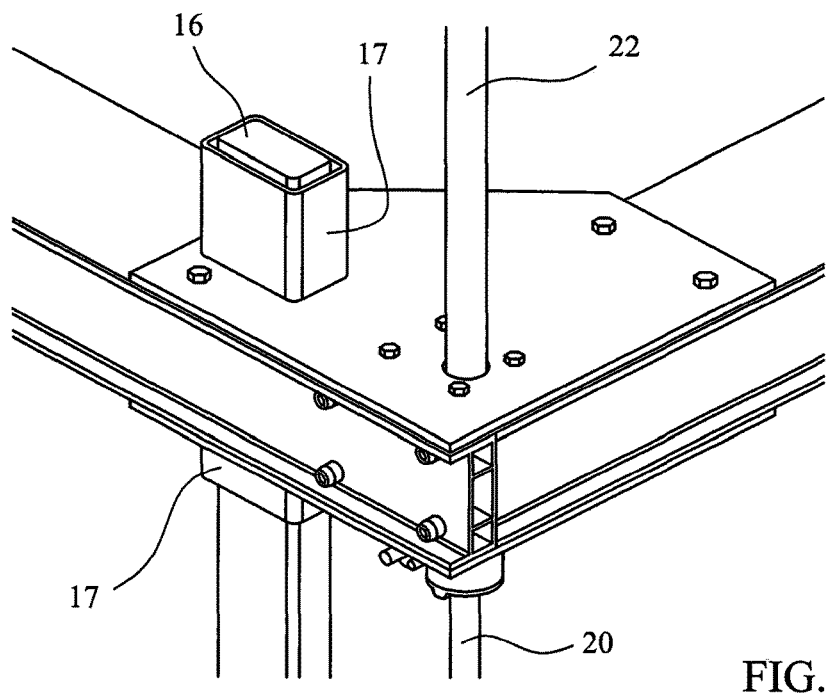
FIG. 8 illustrates an overview of the corner portion as shown in FIG. 7.

In the illustrated form best seen by FIGS. 4, 6 and 7 of the drawings, each lifting device 19 features a threaded vertical shaft 20, extending through a housing 21 that incorporates a mechanism to cause rotation of the threaded shaft and hence enable it to move along a longitudinal axis and lift platform 15 away from the foundation surface 18. This type of drive technology is commercially available, e.g. as supplied by Power Jacks of Scotland. Potentially other lifting systems are possible as a replacement, e.g. incorporating hydraulic or pneumatic shafts, however, it is expected that the simplicity and robustness of a power jack is best suited for the invention.

Each threaded shaft 19 is received above platform 15 in a sleeve 22 of comparable length, such that the entire threaded portion is substantially enclosed when platform 15 is in its lowermost position (FIG. 2), which corresponds to most of its service life. In other words, since house 10 and platform 15 is only intended to be raised during an emergency flood event (or periodic testing), threaded shafts 19 will normally not be visible. Furthermore, guideposts 16 and upstanding sleeve portions 22 will likely be hidden within sidewalls, supporting columns of the house or associated cladding such that it is not externally apparent that the house is capable of being raised from its foundations. The main benefit of this is that there can be a traditional (or custom) appearance to the external finish of the property.

In a preferred form of the invention the elevating mechanism 19 is preferably driven by a single power source, such as a torque motor. Each shaft housing 21 (e.g. a reduction gearbox) receives a drive shaft 23, ultimately connected to torque motor 24 for actuation of the elevation function. The torque motor can be both driven from mains electricity and/or a battery charged by renewable devices. It is intended that platform 15 is raised evenly at all corners, although advanced versions of the elevatable house could provide independent control of the elevation points which might account for subsidence or other irregularities in the foundation level and assist with maintenance or repairs. Such an arrangement would require modification to sleeve 17 to enable a degree of tilt.

Each threaded shaft 19 is abutted against a foot element 25 built into the foundation. A foot 25 could include a ball joint or other bearing means that enables shafts 19 to turn while providing a solid surface against which to push against, thereby elevating platform 15 as shaft 19 extends relative to housing 21.

The elevating function can be managed by a controller, triggered manually (by an override function) or in automatic response to a particular signal, e.g. flood warning issued by a local authority/Environment Agency or a flow switch. In the case of the Environment Agency, this has one of the most sophisticated storm and water level monitoring systems in the world. In the case of a flow switch, this could be set at a lower level to the house so that the house starts to elevate before floodwater has a chance to reach it.

The control device of the elevating function is intended to work in conjunction with the flood warning system, primarily responding to email and sms warnings but also having a secondary response to radio signals from a transponder (e.g. as provided by Jigsaw M2M or Aquaread). The speed of elevation can be as fast or slow as practical and safe according to the operating capabilities of the components and the system can be set to have different height settings based on local flood risk levels. A relatively slow elevation would provide the best power efficiency and would be suitable in almost all circumstances, except a flash flood caused by a river breaking its banks etc., although even an event such as that could be predicted ahead of time.

It will be clear to a skilled reader that the maximum elevation is dictated by the guideposts and vertical shafts of the lift mechanism which could be built to any specification, in consideration of known safety factors. The elevation requirements of any particular house can be assessed according to historical and projected data for the likelihood and severity of a flood in a particular area. The expected 'standard' specification of lift mechanism according to the invention would be two meters above ground level with a capacity of twenty tonnes minimum, although it is preferable that the building is raised to a minimum safe height for a given situation and should not be raised to a full extension where there is no need. Greater height gives greater risk of instability, especially from high wind conditions in a storm.

For the house to remain habitable when at an elevated position it is intended that service and drainage connections be adapted for continued use, i.e. up to a height of approximately two meters for at least three days, while flood waters inundate the foundations of the house. This requires consideration of water supply/removal, electricity, gas and telecommunications. In practice it is likely that municipal supplies will be turned off during a flood situation for safety reasons, however, the present system makes provision for reconnection as soon as services are available or provides the ability for vital functions to remain active in the event of an emergency.

FIGS. 9 to 12 illustrate various features of the connections which could enable an elevated house to be habitable.

Figure 9:
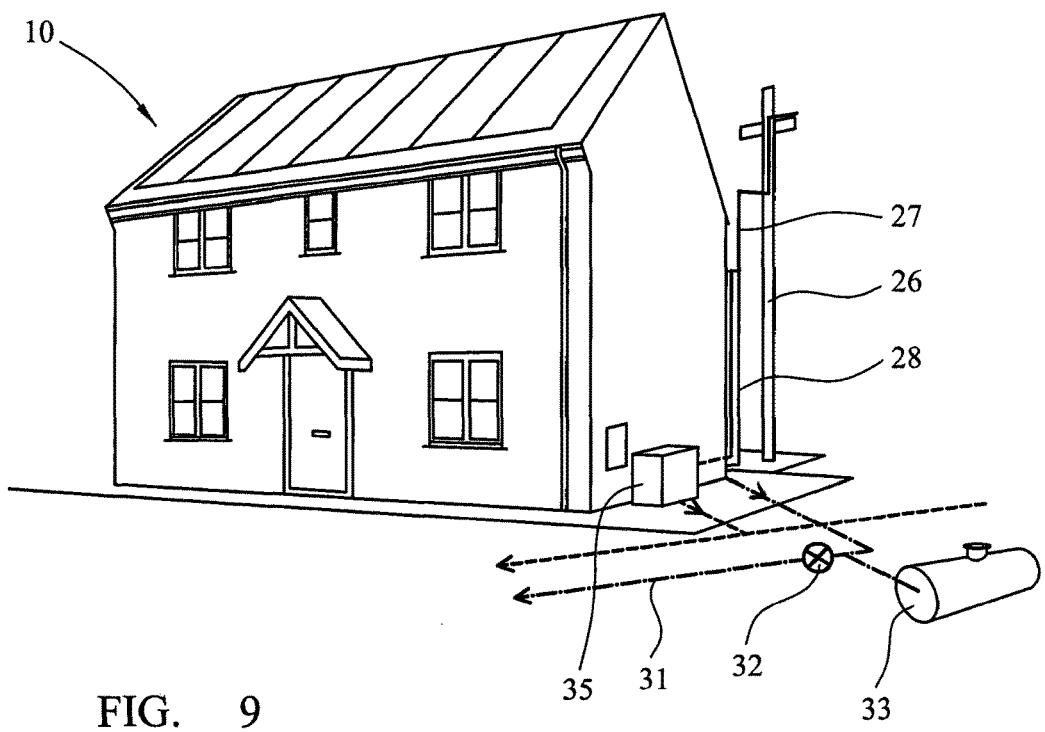
FIGS. 9 and 10 illustrate views of a ground level and raised house according to the invention.
Figure 10:
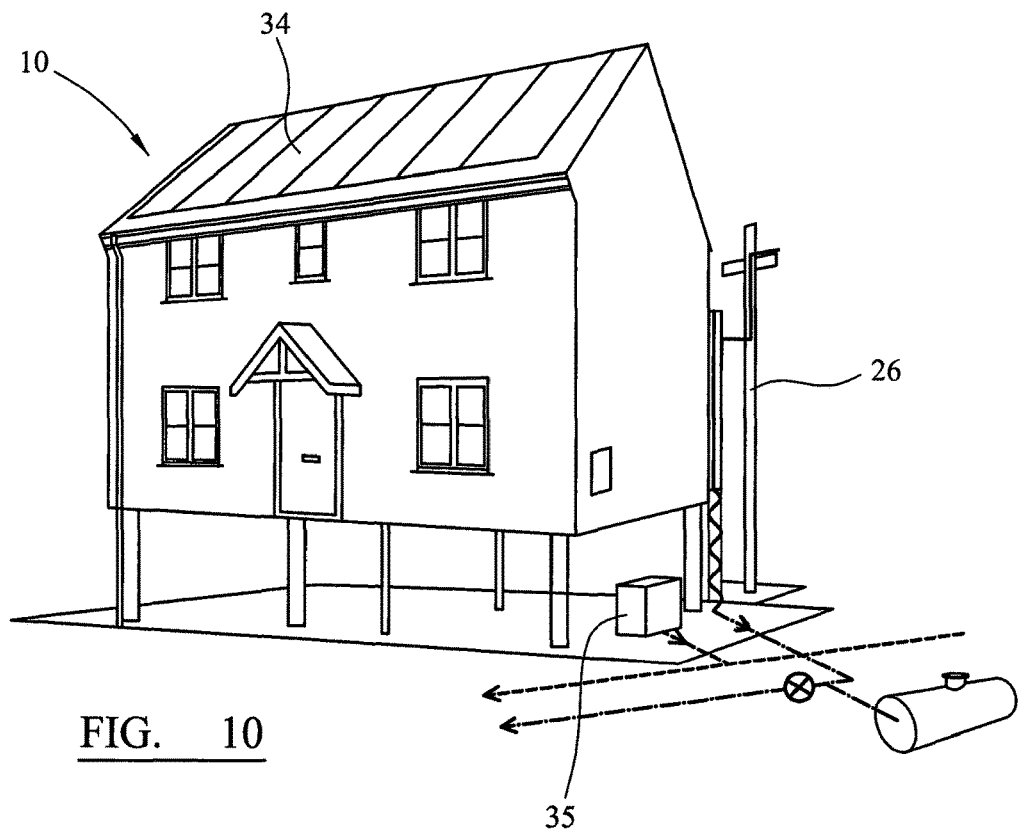
Figure 11:
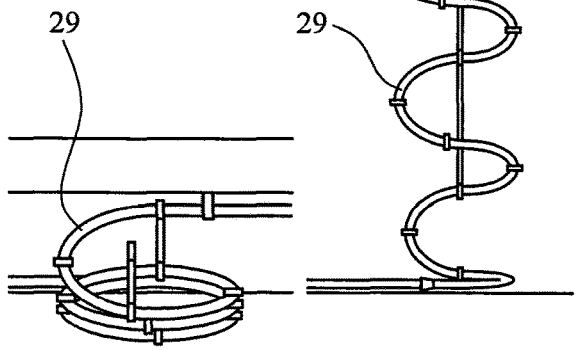
FIGS. 11 and 12 illustrate aspects of an adaptable connection for utility services.
Figure 12:
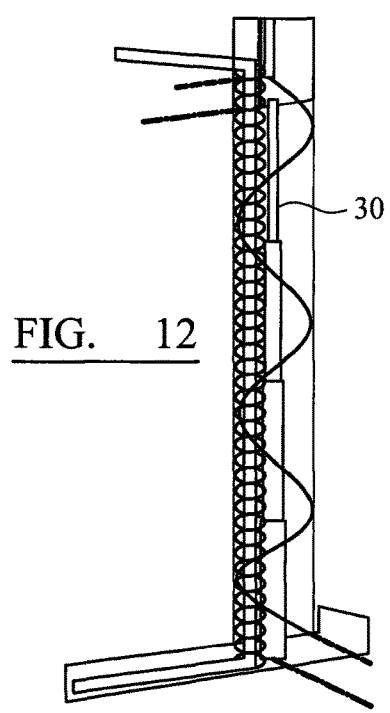

FIG. 9 illustrates a house 10 in a normal grounded position where a power/telephone pole 26 is situated adjacent. Relatively little modification to conventional connections may be needed so long as power line 27 has sufficient flexibility and length to account for a 2 meter change in elevation. Alternatively, or in addition, various connections may be made from an underground supply by way of a telescopic column or cladding 28, best shown by FIG. 12. It is preferable that utilities are grouped together at one corner of the house 10 and contained within the service column 28 which is weather proof, resilient and protective. For example, potable water could flow within the vertical steel stanchion. FIG. 10 shows the house 10 in a raised position where column 28 is extended.

Services are connectable via flexible pipes, i.e. coiled (FIG. 11) 29 and/or telescopic 30, to accommodate elevation of the house, e.g. up to two meters.

Preferably, in one form of the invention, an electric meter will be housed within a sealed box 35 that remains at ground level, such that the main supply cable remains unmoved during a flood. Meanwhile, a service cable from the meter to the house is flexible or telescopic as mentioned for use when the house elevates.

Preferably the main sewage line 31 out of house 10 is fitted with a non-return valve 32 in order to prevent foul water back into the property. The integral self-activating flap valve will operate under flood conditions when water surges back through the drainage system. Outgoing waste can also be bypassed to an emergency waste water tank 33 located underground. After flood waters have receded and the property is back at ground level, flow to the main sewage system will return and tank 33 can be emptied and cleaned by a service engineer.

An example of suitable non-return valve is the Flood Angel®. A suitable tank may be a Vortech 1100 L underground water tank in a vertical orientation (by contrast to the horizontal tank 33 illustrated).

Regulations may dictate that water supply pipes from public mains require a cut off valve and mechanism to temporarily disconnect supply to the house when is it elevated. After the supply pipe is disconnected, a supply of clean water is provided from an emergency storage tank, e.g. located within the house itself. The emergency storage tank will need to be connected to the mains supply during normal conditions so that it is filled with water ready for the emergency scenario. In effect it is a buffer tank. It should also be suitably sized to be capable of supplying the required amount of water needed for the household, e.g. calculated at two liters per person per day equals twenty four liters of potable water for four people for three days.

If it is considered that washing facilities, as well as drinking water, are needed in the emergency scenario, then a larger emergency storage tank will be required. It has been established above that 24 liters of drinking water is needed for a household of 4 people over 3 days. If the house is fitted with a 6/9liters per minute shower, a person taking a 5 minute shower will use up to 45 liters of water, so for a household of 4 persons having a daily shower that would equate to 180 liters per day. It is expected that potable water will remain connected and water authorities continue to keep supply on in the event of a flood.

By making an allowance for hand washing and use of a kitchen sink, guidance given in the Code for Sustainable Homes indicates a rate of 10.5 L/person/day. So, for 4 people a figure of 42 L/day is expected.

For a period of 3 days, a 4 person household would require:
 Drinking water for 3 days=8×3=24 liters
 Daily shower for 3 days=180×3=540 liters
 Taps (hand wash, kitchen, utility)=42×3=126 liters
 Total emergency water required=690 liters An emergency storage tank of 690 liters (minimum capacity) would be required, however, there is a risk that the quality of water will deteriorate if too much water is stored and turnover is low. It is important that the water quality from the emergency storage tank is suitable for drinking, so it should be regularly replenished, until the point of disconnection in times of flooding. The tank should be an approved type made from appropriate materials and sealed, with the exception of associated pipework. There should be a regular maintenance regime, which would include water quality testing. The system can be designed so that the water from the emergency storage tank can be heated on demand for showers from Solar PV means. The preparation of the property for 'off grid' functions can be controlled by the same central device used to control the lifting system either automatically by electronics or instructions to follow as part of a lift initiation sequence.

Consideration should be given to the weight of this tank when filled and where it is located within the house. If the tank is not located in the loft, a pump will be required to distribute the water. It may be possible for the pump to be powered by photovoltaics.

As discussed above, care would need to be taken to ensure that a storage tank of this size is able to maintain the water quality standards required for potable water. Health and Safety issues must be addressed for a temporary storage solution.

With regard to toilet flushing during an elevated/emergency use situation, grey water can be used to provide water for toilet flushing in the emergency situation. A cut off valve and mechanism to temporarily disconnect the mains water supply to the house is required for when the house is lifted. After the supply pipe is disconnected, a supply of water will come from the header tank in the loft, which will feed a gravity supply to toilet(s) in the house. The header tank will be filled during normal conditions, so that it is ready for the emergency scenario. The capacity of the header tank should be sufficient to supply the required amount of water needed for the household, which is calculated as follows.

On average the number of toilet flushes per person per day is 5, so for a 4 person household there would be 20 flushes per day. Based on a 3 day period, the amount of water required for a household of 4 persons for flushing=20×3=60 liters. Accordingly, a temporary supply of 60 liters (minimum capacity) would be required to provide the household with a working toilet for up to 3 days.

If an underground harvesting tank is used, it will need to be designed against flotation and the connection to it will be disconnected and then reconnected when the house is lowered to ground level and flood waters have receded to a safe distance. Again, Health and Safety issues will be addressed with Local Authority Environmental Officers.

It is desirable that an emergency storage tank is available, as illustrated, for waste water disposal. Foul waste water pipes to the public sewers require a cut off valve (32) and mechanism to temporarily disconnect the foul outfall pipe 31 from the house when it is elevated. After the outfall pipe is disconnected, foul waste water is directed to the emergency waste water storage tank 33, which could alternatively be located within the house itself.

The location of the waste water tank is an important consideration, as septic tanks are usually placed below ground and are vented. Given the fact that there will be rising flood waters, an underground tank may not be able to provide ventilation (without a snorkel) and may itself be at risk of flooding or flotation. It is for these reasons that an above ground waste water tank may be preferable, however health and safety issues may arise from locating a waste water tank above ground even it is only for a short period of time.

The waste water tank, could be located on the ground floor of the house and can be fitted to the gravity feed system via a bypass pipe that can be manually opened if the usual outlet to the foul sewer system is closed. The system can be connected with an air admittance valve if necessary. During normal conditions the tank would be clean and empty so that is ready for the emergency scenario. The waste water tank should be suitably sized to cater for the household over a 3 day period, which is calculated as follows:

Based on the above figures, the total emergency water supply for 4 people over 3 days is:
 Drinking Water—24 liters
 Bathing—540 liters
 Taps—126 liters
 Toilet flushing—60 liters
 Total=750 liters It should be emphasised that this is more than enough for the vast majority of emergency scenarios. A waste water storage tank of 1,000 liters (as illustrated in an underground position) would provide the household with more than an adequate emergency foul storage facility for up to 3 days.

Reconnection of the mains system is required when the house is lowered to ground level and the flood waters have receded to a safe distance, and emptying and cleaning of the waste water storage tank will also be necessary, significantly reducing the 'clean up' time taken to enable an occupant to safely return to a usable home.

Electricity, gas (which is an optional service not required if the lightweight house is either passive or highly energy efficient) and phone lines will require a disconnection mechanism to temporarily disconnect the service lines from the house when it is elevated. It is proposed that the house will be fitted with Solar PV panels 34 on the roof, which will provide a source of electrical energy to the house when the mains supply is disconnected. Solar panel electricity systems, also known as solar photovoltaics (PV), capture the sun's energy using photovoltaic cells. These cells do not need direct sunlight to work, as they can still generate some electricity on a cloudy day. The cells convert sunlight into electricity, which can be used to power household appliances and lighting. An air source Heat pump and solar thermal technology can also be utilised (and work when the property is elevated).

Preferably, heating and cooking appliances would have to be compatible with electricity from a PV or other renewable source of supply.

Reconnection of the utility lines is required when the house is lowered to ground level and the flood waters have receded to a safe distance.

A further modification according to the invention involves installation of a net/mesh material attached by opposing edges to the underside of the platform/base 15 and foundation 18. As such, when the lifting mechanism is engaged to raise the building, a net (normally collapsed/folded) is erected that prevents entry to the exposed foundation area underneath the building. This avoids debris being deposited under the building from flood waters and denies unauthorised access by people. The net/mesh may be laid on in a shape to match the building floorplan, e.g. a rectangular fence is erectable corresponding to platform 15 of FIG. 2.

In any event, if debris is inadvertently deposited (or breaks through the net) then this at least can be removed before the building is lowered since control of that function is possible in an active (compared to passive) system.

The invention claimed is:

1. An elevatable building for preventing flood damage including:
    a foundation permanently set into a ground level surface;
    a platform;
    a plurality of walls and a roof assembled on the platform that define a habitable space of the building;
    a lifting mechanism associated with the platform, the lifting mechanism having a driving system and a plurality of threaded vertical shafts engageable with the driving system for raising the platform above the ground level surface and away from the foundation to enable flood water to pass beneath the platform, wherein the driving system is arranged to move the platform axially along the threaded vertical shafts and, in at least some operational conditions, at least part of each threaded vertical shaft passes directly through and is received above the platform and the parts of the threaded vertical shafts received above the platform are housed in the walls and are hidden from view by the walls; and
    an adaptable connection for directing utility services from the ground level toward and/or into the habitable space, wherein the adaptable connection is capable of adapting to the height from ground level of the platform when it is raised or lowered by the lifting mechanism, thereby enabling utility services to remain connected while the platform is raised above the ground level surface.

2. The elevatable building of claim 1, further including at least one guide post extending vertically from the foundation.

3. The elevatable building of claim 2, wherein the at least one guide post is telescopic.

4. The elevatable building of claim 2, wherein the at least one guide posts includes a plurality of guide posts extending vertically from the foundation, wherein each guide post is positioned adjacent a respective corner of the building.

5. The elevatable building of claim 4, wherein each threaded vertical shaft is located adjacent a respective one of the plurality of guide posts.

6. The elevatable building of claim 1, wherein the plurality of walls and roof are lightweight in order to assist structural performance.

7. The elevatable building of claim 1, including a control means able to activate the lifting mechanism in response to a manual command, or automatically in response to a flood warning signal via a central CPU system.

8. The elevatable building of claim 1, wherein the adaptable connection includes at least one of any of the following services, singularly or in combination: potable water piping, waste water piping, electrical cabling, and communications cabling.

9. The elevatable building of claim 8, wherein the adaptable connection includes a telescopic support.

10. The elevatable building of claim 1, including a plurality of elongate sleeves, wherein each sleeve is arranged to accommodate a respective one of the threaded vertical shafts.

11. The elevatable building of claim 1, wherein the drive means includes a single motor engageable via one or more drive shafts to the threaded vertical shafts.

12. The elevatable building of claim 1, wherein each threaded vertical shaft is engageable with a drive surface that rotates the vertical shaft causing axial movement of the platform.

13. The elevatable building of claim 12, wherein the lifting mechanism includes for each threaded vertical shaft, a foot element set into the foundation, wherein each foot element receives a distal end of its respective threaded vertical shaft and supports rotating movement thereof.

14. The elevatable building of claim 1, wherein a main sewage line, approaching the elevatable building from an underground position, includes a non-return valve.

15. The elevatable building of claim 1, wherein waste water from the building is able to be directed to a waste water tank located below ground level.

16. The elevatable building of claim 15, wherein the below ground waste water tank has at least 1000 L capacity.

17. The elevatable building of claim 1, wherein a header tank is provided that, in normal use, is maintained in a substantially full state from a mains water supply.

18. The elevatable building of claim 17, wherein the header tank has 500 to 900 L capacity.

19. The elevatable building of claim 1, including a grey water tank, connectable to receive water from grey water sources.

20. The elevatable building of claim 1, including means to disconnect and reconnect utility services such as electricity, water and telecommunications.

21. The elevatable building of claim 1, including a photovoltaic array, solar thermal, air source or other means of energy generation from solar energy for powering main or auxiliary services.

22. The elevatable building of claim 1, including a net material attached to the foundation and an underside of the platform which unfolds to form a net as the building elevates.

23. The elevatable building according to claim 1, wherein each of the walls includes at least one support column and each threaded vertical shaft is arranged to extend into a respective one of the support columns.

24. The elevatable building of claim 2, wherein the at least one guide post is received by a sleeve portion of the platform.

25. The elevatable building of claim 1, wherein each vertical shaft is engageable with the driving system via a respective reduction gearbox.

26. An elevatable building for preventing flood damage including:
   a foundation permanently set into a ground level surface;
   a platform;
   a plurality of walls and a roof assembled on the platform that define a habitable space of the building;
   a lifting mechanism associated with the platform, the lifting mechanism having a driving system and at least one threaded vertical shaft engageable with the driving system for raising the platform above the ground level surface and away from the foundation to enable flood water to pass beneath the platform, wherein the at least one threaded vertical shaft is engageable with a drive surface that rotates the at least one vertical shaft to move the platform axially along the at least one threaded vertical shaft, and in at least some operational conditions, at least part of the at least one threaded vertical shaft passes directly through the platform and is received above the platform in an area of the platform enclosed by outer surfaces of the walls, and is hidden from view by the walls; and
   an adaptable connection for directing utility services from the ground level toward the habitable space, wherein the adaptable connection is capable of adapting to the height from ground level of the platform when it is raised or lowered by the lifting mechanism, thereby enabling utility services to remain connected while the platform is raised above the ground level surface.

27. The elevatable building according to claim 26, wherein the part of the at least one threaded shaft received above the platform is housed within at least one of the walls.

28. The elevatable building according to claim 27, wherein at least one of the walls includes at least one support column and the at least one threaded vertical shaft is arranged to extend into the at least one support column.

29. An elevatable building for preventing flood damage including:
   a foundation permanently set into a ground level surface;
   a platform;
   a plurality of walls and a roof assembled on the platform that define a habitable space of the building;
   a lifting mechanism associated with the platform, the lifting mechanism having a driving system and at least one vertical shaft engageable with the driving system for raising the platform above the ground surface and away from the foundation to enable flood water to pass beneath the platform, wherein the driving system is arranged to move the platform axially along the at least one vertical shaft from a first position to a second position, and in at least some operable conditions, at least part of the at least one threaded vertical shaft passes directly through and is received above the platform in an area of the platform enclosed by outer surfaces of the walls, and is hidden from view by the walls; and
   an adaptable connection for directing utility services from the ground level toward the habitable space, wherein the adaptable connection is capable of adapting to the height from ground level of the platform when it is raised or lowered by the lifting mechanism, thereby enabling utility services to remain connected while the platform is raised above the ground level surface.

* * * * *